United States Patent Office 3,440,886
Patented Apr. 29, 1969

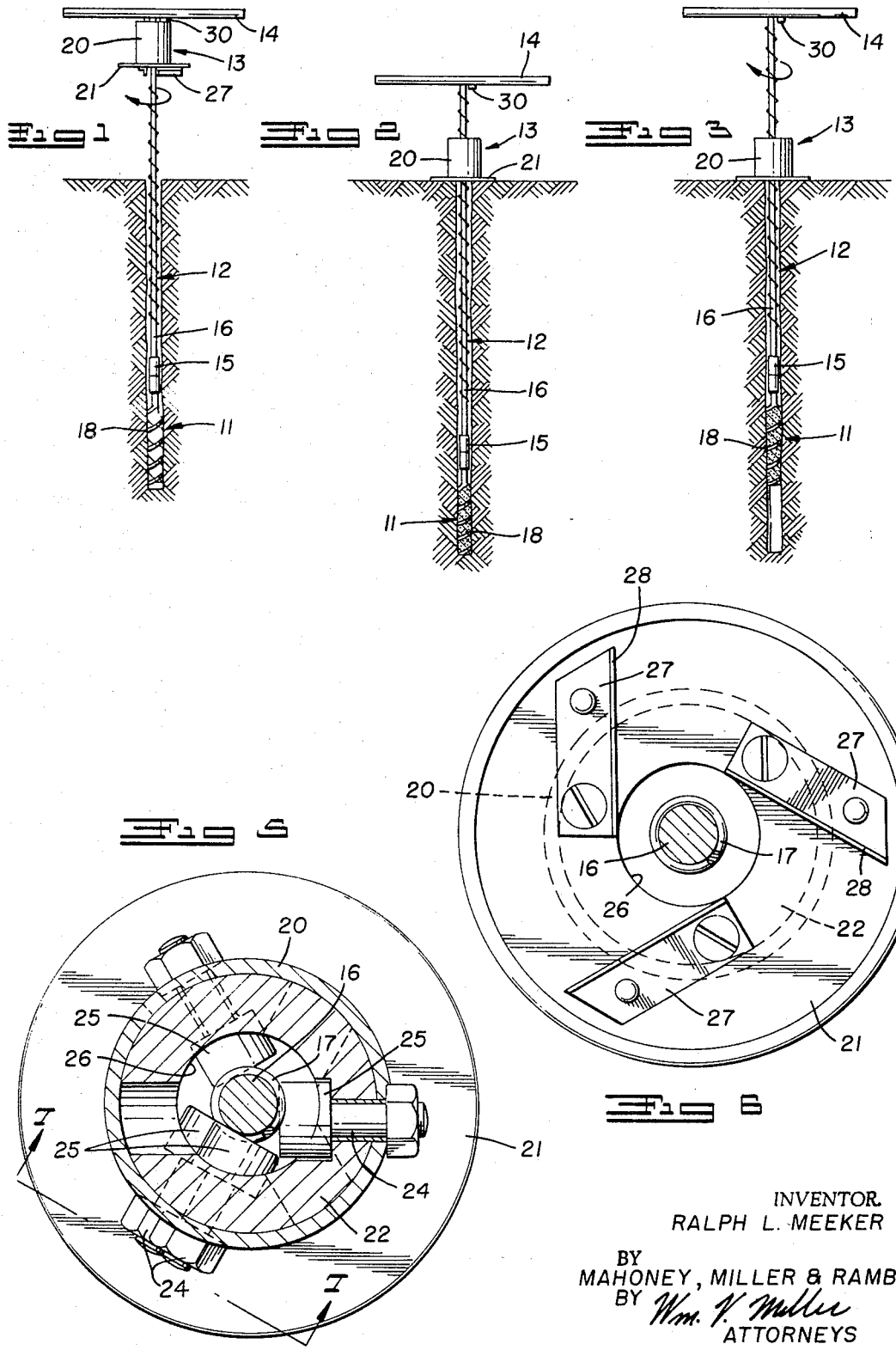

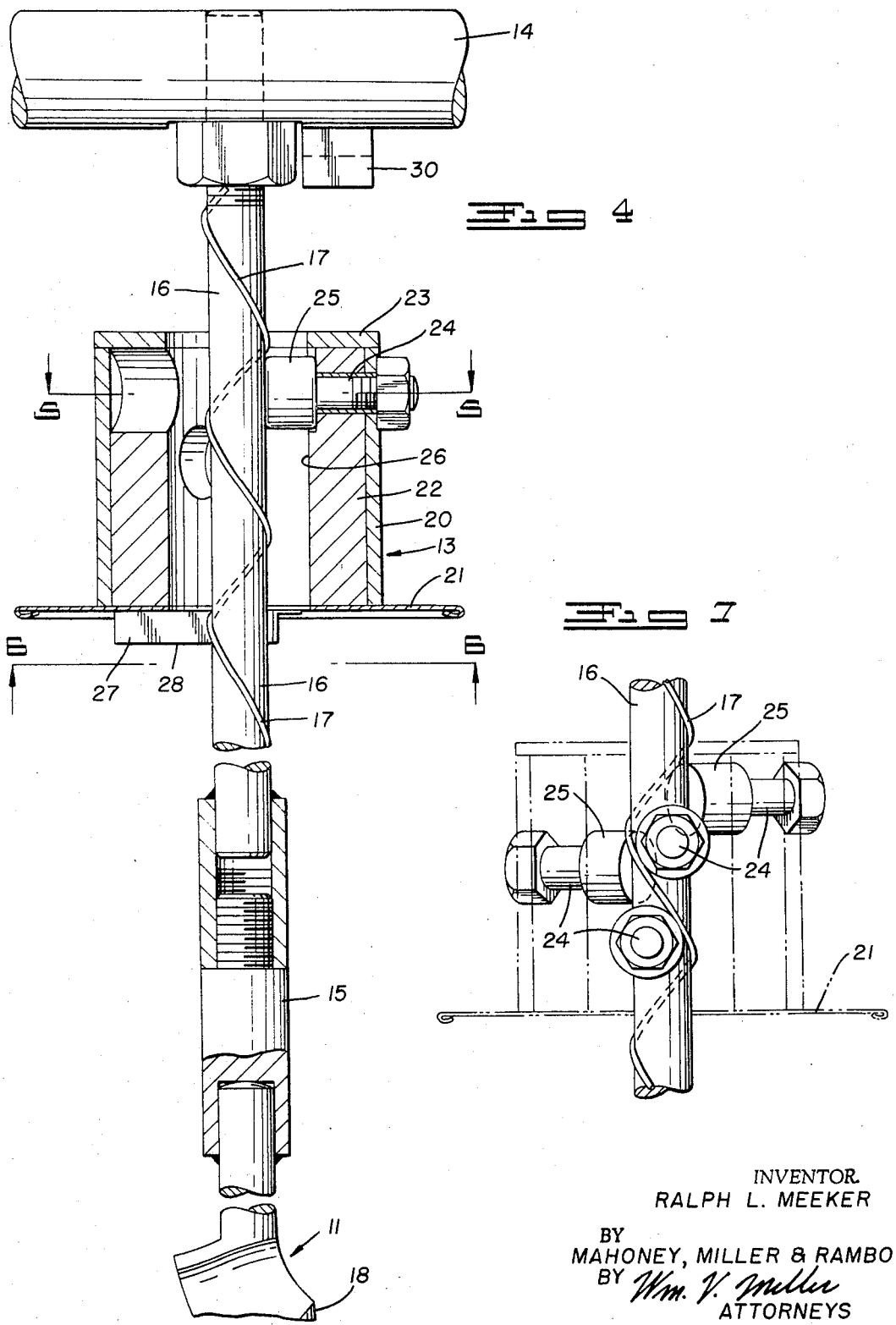

3,440,886
SOIL SAMPLING AUGER
Ralph L. Meeker, 138 Glencoe Road,
Columbus, Ohio 43214
Filed Oct. 4, 1967, Ser. No. 672,772
Int. Cl. G01n 1/10
U.S. Cl. 73—424      4 Claims

ABSTRACT OF THE DISCLOSURE

A soil sampling device in the form of an auger adapted to be screwed into the ground to a predetermined depth to collect a sample of the soil on the auger. The auger is provided with a nut and bearing plate unit which pulls the auger from the ground without losing the soil sample.

Prior art

At the present time, it is customary in taking soil samples to use an auger which consists of a metal shaft with a pointed bit having a helical cutting screw thread and an upper T-shaped handle. The bit is screwed into the ground by turning the handle manually and when the selected depth is reached, the auger is pulled from the ground by means of the handle so as to remove the soil sample which has accumulated on the bit. Since the soil sample would be lost from the sampling bit if the turning was reversed to thread it out of the ground, it is necessary to actually pull it from the ground and this obviously is difficult to do and the pulling force and unevenness of pull could and often does cause back injury to the operator. The amount of pulling required to use a common prior art auger type soil sampler under moist soil conditions and in several types of soils has been recorded in "moment pounds." The average depth recorded for this pulling was at about 18 inches with a fully loaded bit 6 inches long and the results are as follows:

|  | Pounds |
|---|---|
| Clermont silt loam | 150–170 |
| Genesee silt loam | 100–160 |
| Rossmoyne silt loam | 100–200 |

General description of invention

According to the present invention, I provide an auger with the usual soil sampling bit section on its lower end and the usual T-shaped handle on its upper end. However, in addition, above the bit section, with its helical thread extending in one direction around the shaft, I provide an additional lifting screw section above it which extends around the shaft in a reverse direction. This lifting section is of sufficient extent that it will always extend above the ground and is adapted to cooperate with a lift nut and bearing plate unit which cooperates with the screw thread thereof as the auger is threaded into the ground, the nut and bearing plate unit is positioned above the ground but when it has reached its desired extent, the nut and bearing plate unit is screwed downwardly until it contacts the ground. Then turning the auger with the handle in the same direction will exert an axial upward pull which will pull the auger from the ground with the soil sample intact on the bit.

Brief description of drawings

In the accompanying drawings, I have illustrated a preferred form of my invention and in these drawings:

FIGURE 1 is a schematic view illustrating my soil sampling auger being screwed into the ground.

FIGURE 2 is a similar view showing the nut and bearing plate unit of my auger in contact with the ground.

FIGURE 3 is a similar view but showing the auger being turned to pull the bit from the ground.

FIGURE 4 is an axaial sectional view of my auger.

FIGURE 5 is a transverse sectional view taken along line 5—5 of FIGURE 4.

FIGURE 6 is a transverse sectional view taken along line 6—6 of FIGURE 4.

FIGURE 7 is a schematic side elevational view taken along line 7—7 of FIGURE 5 with the housing of the lift nut removed.

Detailed description of the drawings

With specific reference to the drawings, I have illustrated how my auger is used in FIGURES 1–3 and its detailed construction in FIGURES 4–7. Generally, it comprises; a shaft with a lower sampling screw bit section 11; an upper lift screw section 12, axially spaced above the bit section; a nut and bearing plate unit 13 surrounding and cooperating with the lift screw section 12; and finally, a handle 14 rigidly secured on the upper end of the shaft and extending radially outwardly in opposite directions therefrom.

The bit section 11 may be formed in the usual way of metal with a wide helical cutting screw and a pointed end. The wide cutting screw will bore into the ground when the handle 14 is turned and during this boring action will pick up a sample of the soil through which it passes.

The upper end of the bit section 11 is shown coupled by a suitable coupling 15 to the lower end of a metal shaft 16. This shaft 16 is provided with a helical screw thread 17 suitably formed thereon or applied thereto. The helical screw 17 turns around the shaft in a reverse direction relative to the turn of the helical cutting screw 18 on the bit 11.

The lift and bearing plate unit 13 which cooperates with the lift screw 17 preferably comprises an outer tubular housing or casing 20 which has a flat bearing plate or collar 21 at its lower edge. This plate has a lower side adapted to contact with the ground. Within this sleeve housing 20 is a mounting sleeve 22 covered by a cap collar 23. Roller shaft and bushing units 24 are mounted on the sleeve 22 and associated housing 20 to locate screw-engaging antifriction rollers 25 in a spaced helical pattern in the central opening 26 extending completely through the unit 13 so that the shaft 16 can pass therethrough. The rollers 25 are shown as four in number and are so arranged that they engage the screw thread 17. The plate 21 is shown rigidly connected to the lower end of the sleeve 22 by means of connecting lugs 27 which are substantially tangentially disposed relative to the sleeve and which provide ground-entering sharp edges 28 at their lower sides.

On the extreme upper end of the shaft 16, the handle 14 is either formed thereon or mounted as a separate piece thereon in the manner illustrated or in any other suitable manner. On one part of the handle is a depending magnet 30, adjacent the shaft, for holding the nut up against the handle when it is rotated to move it to that position as shown in FIGURE 1. It will be noted that the thread 17 does extend upwardly to a point adjacent the handle.

In the use of this auger, individual loads of soil are commonly taken from a hole in the ground at repeated successive increments or depth. The hole becomes deeper as each sample is extracted. To use my auger, the nut and lift plate unit 13 is first rotated to the upper position shown in FIGURE 1. Then the point of the bit is placed in contact with the ground where the sample is to be taken and the entire device is rotated by means of the handle 14. Assuming the thread 18 of the bit turns clockwise, the handle 14 is turned clockwise to cause the bit to bore into the earth. As it bores into the earth, it picks up a sample of the earth through which it passes. When the desired depth is reached, the attraction of the magnet 30 is overcome and the nut and lift unit 13 is turned down to the position shown in FIGURE 2 where it contacts with the ground. Continued clockwise rotation of the shaft by means of the handle 14 will now exert an upward pull on the entire shaft and the attached bit due to the fact that the shaft will thread outwardly through the nut 13 because the lift screw thread 17 will extend counterclockwise or reversely relative to the clockwise threading of the bit 18. The members 27 provide cutting edges 28 which dig into the ground and prevent rotation of the nut. The rollers 25 engaging the screw thread 17 provide antifriction means which makes it relatively easy to turn the shaft 16 by means of the handle 14. Mechanical advantage is obtained by the screw action of the threaded section 12 of the shaft and the nut 13 resting on the ground. The magnitude of mechanical advantage and speed of operation is dependent on the degree of slope or pitch of the helical thread 17 on the shaft 16. The result is that the auger of this invention can be used to withdraw soil samples with speed and ease and without danger of losing the sample.

Various other advantages will be apparent.

Having thus described this application, what is claimed is:

1. A soil-testing auger comprising a lower bit section with a soil-collecting helical screw turned in one direction, an upper lift screw section having a helical thread turned in an opposite direction, and a lift nut surrounding said lift section and having means for engaging the helical thread thereof and adapted to engage with the ground after the bit section is screwed therein to a predetermined level; said means on the nut for engaging the thread of the lift section comprising antifriction means, said lift screw section comprising a shaft having a turning handle at its upper end and said bit being coupled to the lower end of the lift section and being axially aligned therewith.

2. A soil-testing auger according to claim 1 wherein said antifriction means comprise rollers helically arranged in an axial passage through which said upper screw section passes.

3. A soil-testing auger according to claim 1 in which said nut has a ground-engaging plate of greater ground-engaging area than said nut.

4. A soil-testing apparatus according to claim 3 in which said plate has ground-entering portions at its lower side to prevent rotation when it engages the ground.

References Cited

UNITED STATES PATENTS

| 180,268 | 7/1876 | Morgan et al. | 175—203 |
| 1,152,337 | 8/1915 | Nelson | 175—118 |
| 2,959,978 | 11/1960 | Boutwell | 74—89.15 |

LOUIS R. PRINCE, *Primary Examiner.*

HARRY C. POST III, *Assistant Examiner.*

U.S. Cl. X.R.

74—89.15; 175—113, 203